United States Patent
Prendes et al.

(10) Patent No.: US 11,128,989 B2
(45) Date of Patent: Sep. 21, 2021

(54) IDENTIFICATION AND LOCATION OF PERSONAL AREA NETWORK DEVICE

(71) Applicant: SR Technologies, Inc., Sunrise, FL (US)

(72) Inventors: Joaquin Prendes, Plantation, FL (US); Alexander Vallejo, Miramar, FL (US); Steven Romanow, Sunrise, FL (US); Mark Passler, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 16/984,812

(22) Filed: Aug. 4, 2020

(65) Prior Publication Data

US 2020/0389767 A1    Dec. 10, 2020

Related U.S. Application Data

(63) Continuation of application No. 16/810,495, filed on Mar. 5, 2020, now Pat. No. 10,771,927.

(60) Provisional application No. 62/847,041, filed on May 13, 2019.

(51) Int. Cl.
| | |
|---|---|
| *H04W 24/00* | (2009.01) |
| *H04W 4/029* | (2018.01) |
| *G01S 5/02* | (2010.01) |
| *H04W 68/00* | (2009.01) |

(52) U.S. Cl.
CPC .......... *H04W 4/029* (2018.02); *G01S 5/0205* (2013.01); *H04W 68/005* (2013.01)

(58) Field of Classification Search
None
See application file for complete search history.

(56) References Cited

U.S. PATENT DOCUMENTS

2019/0059071 A1    2/2019   Khoryaev et al.
2019/0391262 A1*  12/2019   Summers ............... G01S 15/74

\* cited by examiner

*Primary Examiner* — Suhail Khan
(74) *Attorney, Agent, or Firm* — Christopher & Weisberg, P.A.

(57) ABSTRACT

A method, device and system are disclosed for geo-locating a device. In one embodiment, a first wireless transmitter/receiver pages a second wireless transmitter/receiver to establish a communication. A plurality of packets transmitted by the first wireless transmitter/receiver and transmitted by the second wireless transmitter/receiver are received by a wireless receiver. The reception time of packets transmitted by the first wireless transmitter/receiver and the second wireless transmitter/receiver is recorded. A time delay based at least in part on the recorded reception times of each packet is calculated, and a location of the second wireless device based on the calculated time delay is determined. A target location of the second wireless transmitter/receiver is determined based on a plurality of the determined locations of the second wireless transmitter/receiver.

20 Claims, 9 Drawing Sheets

RX/TX cycle of master transceiver in normal mode for single-slot packets

RX/TX cycle of slave transceiver in normal mode for single-slot packets

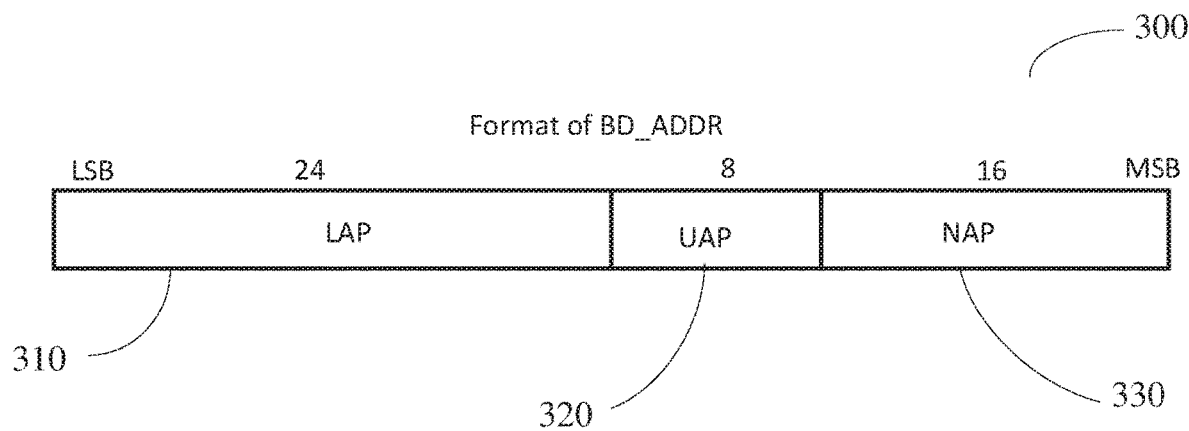

FIG. 7

| | Chan | TYPE | Role | LMP Opcode | TOA | Delta Time | Shift Time |
|---|---|---|---|---|---|---|---|
| | 0 | ID | | | 2806496 | 0 | 0 |
| | 0 | ID | | | 2806808 | 0312 | 312 |
| 720 | 0 | ID | | | 2807122 | 0314 | 626 |
| 721 | 69 | FHS | Master | | 2807746 | 0624 | 1250 |
| 722 | 58 | POLL | Master | | 2810246 | 2500 | 3750 |
| | 49 | NULL | Slave | | 2810873 | 0627 | 4377 |
| 725 | 3 | POLL | Master | | 2813996 | 3123 | 7500 |
| | 66 | DM1 | Master | features_req | 2815246 | 1250 | 8750 |
| 730 | 50 | DM1 | Master | | 2816496 | 1250 | 10000 |
| | 63 | DM1 | Slave | features_res | 2817122 | 0626 | 10626 |
| | 74 | POLL | Master | | 2817746 | 0624 | 11250 |
| 735 | 15 | POLL | Master | | 2818996 | 1250 | 12500 |
| | 7 | DM1 | Master | features_req_ext | 2820246 | 1250 | 13750 |
| | 55 | NULL | Slave | | 2820872 | 0626 | 14376 |
| 736 | 62 | POLL | Master | | 2821496 | 0624 | 15000 |
| 737 | 54 | POLL | Master | | 2822746 | 1250 | 16250 |
| 738 | 31 | POLL | Master | | 2823996 | 1250 | 17500 |
| 739 | 23 | POLL | Master | | 2825246 | 1250 | 18750 |
| 740 | 78 | POLL | Master | | 2826496 | 1250 | 20000 |
| | 65 | DM1 | Slave | features_res_ext | 2827123 | 0627 | 20627 |
| | 70 | POLL | Master | | 2827746 | 0623 | 21250 |
| 745 | 57 | NULL | Slave | | 2828373 | 0627 | 21877 |
| | 17 | DM1 | Master | features_req_ext | 2828996 | 0623 | 22500 |
| | 0 | NULL | Slave | | 2829622 | 0626 | 23126 |
| 750 | 9 | POLL | Master | | 2830246 | 0624 | 23750 |
| 751 | 71 | DM1 | Slave | features_res_ext | 2830873 | 0627 | 24377 |
| 752 | 64 | POLL | Master | | 2831496 | 0623 | 25000 |
| 755 | 77 | NULL | Slave | | 2832123 | 0627 | 25627 |
| | 56 | DM1 | Master | name_req | 2832746 | 0623 | 26250 |
| 760 | 69 | NULL | Slave | | 2833372 | 0626 | 26876 |
| | 33 | POLL | Master | | 2833996 | 0624 | 27500 |
| | 4 | DM1 | Slave | name_res | 2834623 | 0627 | 28127 |
| | 25 | POLL | Master | | 2835246 | 0623 | 28750 |
| 765 | 75 | NULL | Slave | | 2835873 | 0627 | 29377 |
| | 1 | DM1 | Master | detach | 2836496 | 0623 | 30000 |
| | 2 | NULL | Slave | | 2837122 | 0626 | 30626 |
| | 72 | POLL | Master | | 2837746 | 0624 | 31250 |
| | 73 | NULL | Slave | | 2838373 | 0627 | 31877 |
| | 13 | POLL | Master | | 2838996 | 0623 | 32500 |
| | 47 | NULL | Slave | | 2839623 | 0627 | 33127 |
| | 5 | POLL | Master | | 2840246 | 0623 | 33750 |
| | 39 | NULL | Slave | | 2840873 | 0627 | 34377 |
| | 60 | POLL | Master | | 2841496 | 0623 | 35000 |

Column labels: 710, 711, 712, 713, 714, 715, 716

*FIG. 8*

| | Role | Shift Time | Delta Time | Shift Time MOD 1250 |
|---|---|---|---|---|
| | | 712 | 716 | 715 | 810 |
| | Master | 1250 | 624 | 0 |
| | Master | 3750 | 2500 | 0 |
| | Slave | 4377 | 627 | 627 |
| | Master | 7500 | 3123 | 0 |
| | Master | 8750 | 1250 | 0 |
| | Master | 10000 | 1250 | 0 |
| 820 | Slave | 10626 | 626 | 626 |
| 821 | Master | 11250 | 624 | 0 |
| | Master | 12500 | 1250 | 0 |
| 825 | Master | 13750 | 1250 | 0 |
| | Slave | 14376 | 626 | 626 |
| | Master | 15000 | 624 | 0 |
| | Master | 16250 | 1250 | 0 |
| | Master | 17500 | 1250 | 0 |
| | Master | 18750 | 1250 | 0 |
| 827 | Master | 20000 | 1250 | 0 |
| | Slave | 20627 | 627 | 627 |
| | Master | 21250 | 623 | 0 |
| 830 | Slave | 21877 | 627 | 627 |
| 831 | Master | 22500 | 623 | 0 |
| | Slave | 23126 | 626 | 626 |
| | Master | 23750 | 624 | 0 |
| | Slave | 24377 | 627 | 627 |
| | Master | 25000 | 623 | 0 |
| | Slave | 25627 | 627 | 627 |
| | Master | 26250 | 623 | 0 |
| | Slave | 26876 | 626 | 626 |
| | Master | 27500 | 624 | 0 |
| | Slave | 28127 | 627 | 627 |
| | Master | 28750 | 623 | 0 |
| | Slave | 29377 | 627 | 627 |
| | Master | 30000 | 623 | 0 |
| | Slave | 30626 | 626 | 626 |
| | Master | 31250 | 624 | 0 |
| | Slave | 31877 | 627 | 627 |
| | Master | 32500 | 623 | 0 |
| | Slave | 33127 | 627 | 627 |
| | Master | 33750 | 623 | 0 |
| | Slave | 34377 | 627 | 627 |
| | Master | 35000 | 623 | 0 |

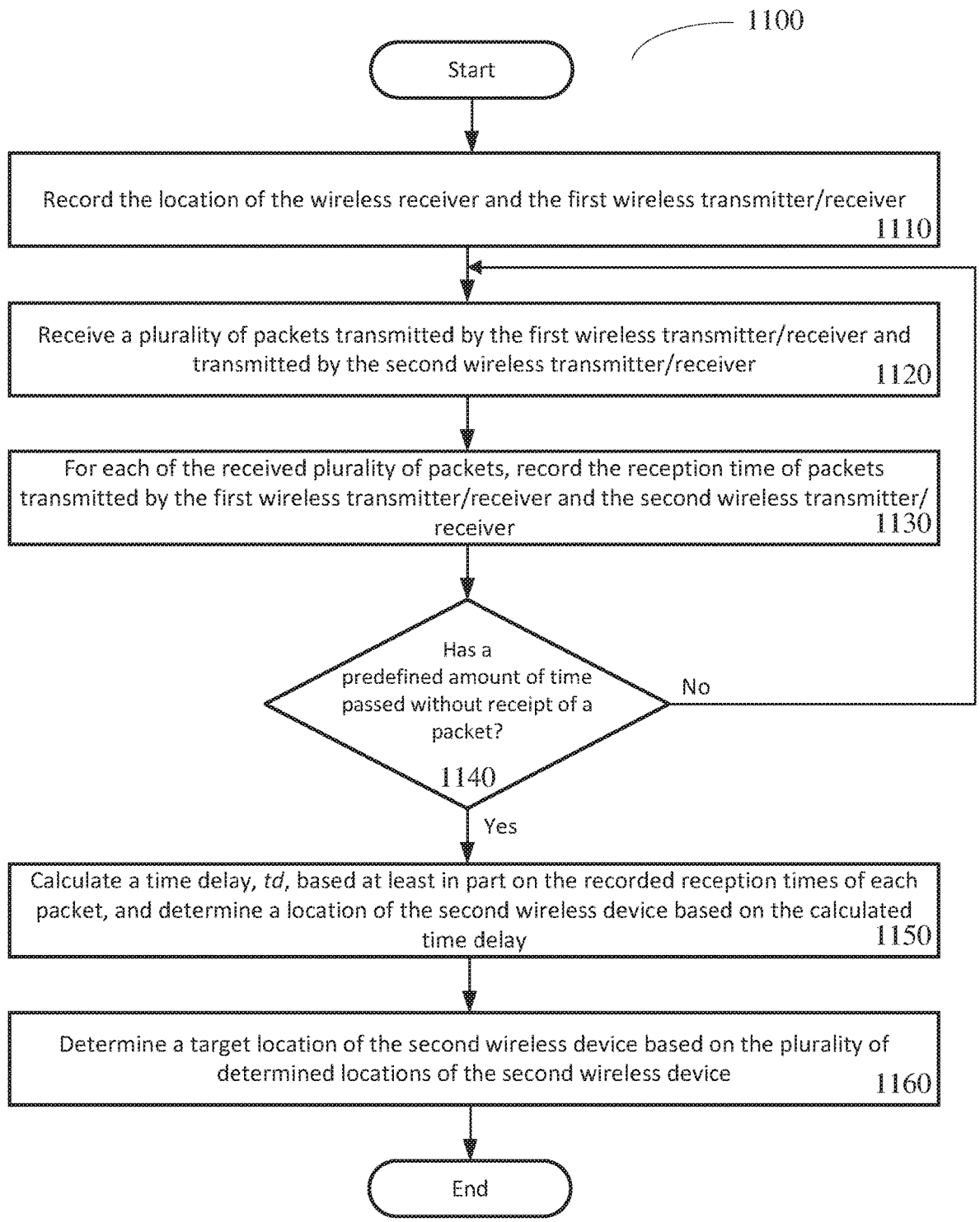

IDENTIFICATION AND LOCATION OF PERSONAL AREA NETWORK DEVICE

CROSS-REFERENCE TO RELATED APPLICATIONS

This application is related to and claims priority to U.S. patent application Ser. No. 16/810,495, filed on Mar. 5, 2020, entitled "IDENTIFICATION AND LOCATION OF PERSONAL AREA NETWORK DEVICE," which claims priority to U.S. Provisional Patent Application No. 62/847,041, filed May 13, 2019, entitled "IDENTIFICATION AND LOCATION OF PERSONAL AREA NETWORK DEVICE", the entireties of both of which are incorporated herein by reference.

TECHNICAL FIELD

The present disclosure relates to wireless communications, and in particular to methods and devices for the discovery and geo-location of an Un-Discoverable Classic Bluetooth Basic Rate (BR) device.

BACKGROUND

The Bluetooth system is specified in "Specification of the Bluetooth® System, Covered Core Package Version: 5.0, Publication Date: Dec. 6, 2016 ("Specification of the Bluetooth® System"). Bluetooth operates in the unlicensed Industrial, Scientific, and Medical (ISM) band from 2.400 to 2.4835 GHz. Classic Bluetooth Basic Rate (BR) and Bluetooth Low Energy (BLE) employ Gaussian Frequency-Shift Keying (GFSK) as the primary modulation scheme, while Classic Bluetooth Enhanced Data Rate (EDR) incorporates differential phase-shift keying (DPSK) for increased throughput. BR may occupy any of 79 radio frequency (RF) channels, spaced by 1 MHz, whereas BLE is limited to 40 RF channels, spaced by 2 MHz. For both BR and BLE, the nominal channel symbol rate is 1 MHz, with a nominal channel symbol duration of 1 µs.

A more complete understanding of the present embodiments, and the attendant advantages and features thereof, will be more readily understood by first describing relevant Bluetooth system details. Relevant details of the Bluetooth system are therefore presented herein. A more complete description can be obtained by reference to the Specification of the Bluetooth® System, the entirety of which is incorporated herein by reference.

Bluetooth is a time division multiplex (TDM) system that includes a "Master" device, which initiates an exchange of data, and a "Slave" device which responds to the Master. The TDM slot duration is 625 µs, and the maximum payload length is such that certain packet types may extend up to five slots in length. Each device will hop to an RF channel once per packet and Slave devices will utilize the timing of their Master to hop in synchronization.

There are two basic types of data packets and links: Asynchronous Connectionless (ACL) and Synchronous Connection Oriented (SCO). ACL is used for data communications with just one ACL link per device pair. SCO is used for real time audio links, and each device may support up to 3 SCO links at one time.

FIG. 1 is a diagram of the receive/transmit (RX/TX) cycle for the master transceiver in normal mode for single-slot packets. Each TX slot and RX slot is of duration 625 µs. The master transceiver transmits in TX slot 110 on hop channel f(k) and is followed by the RX slot 120, on hop channel f(k+1). The master then transmits in the next slot 130 on hop channel f(k+2). The time between consecutive TX slots and RX slots is therefore 1250 µs. FIG. 2 is a diagram of the corresponding RX/TX cycle of the slave transceiver. The slave transceiver receives during slot 210, on hop channel f(k) and transmits on hop channel f(k+1). The duration of the transmitted packet 140 is less than or equal to 426 µs.

FIG. 3 is a diagram that shows the format of the unique Bluetooth Device Address (BD_ADDR) 300. The BD_ADDR 300 is split into three parts, lower address part (LAP) 310, upper address part (UAP) 320, and non-significant address part (NAP) 330. In order to establish a connection to a Bluetooth device only the UAP and LAP are required. The NAP is informative and devices often use a default NAP to establish connectivity.

The location of wireless devices can be performed by various methods. These methods may be classified as active, passive and combined active and passive. In an active location scheme, a device that is determining the location or range, the measuring device, transmits certain packets to the device being located, the target device, and the common method is to measure the time of arrival (TOA) of the response from the target device and compare that to the time of departure (TOD) that the packet was transmitted by the measuring device so as to determine the time for the round trip (RTT). TOD may be measured for a packet that is transmitted from the measuring station addressed to the target station. The TOA of the response from the target station, at the measuring station, is then also measured. If the turnaround time for the target station to receive the packet from the measuring station and to start to transmit the response is known, then the time difference at the measuring station between the TOA and the TOD, minus the turnaround time at the target station will be directly proportional to twice the distance of the target station from the measuring station. For example, if the target station is a wireless device based upon Bluetooth technology, and if the packet transmitted from the measuring station to the target station is a Poll packet, the response from the target station will generally be a Null packet. The effective turnaround time at the target will be the nominal 625 µs slot time. Hence, the time delay, td, between the measuring station and the target station may be determined from the calculation td=(TOA−TOD−Slot Time)/2 and the distance between the measuring station and the target station is then td×c, where c is the speed of light. This method of estimating the distance to a target station by measuring the TOD and TOA and accounting for the turnaround time is known in the art.

In order to geo-locate a Bluetooth device by measuring the time delay td, a series of packet exchanges may be utilized. In the general sense this requires a regular establishment across several connection layers with security, pairing, and encryption. However, to geo-locate the Bluetooth device such that no interaction from the user of the target device is required, a regular establishment cannot be used.

SUMMARY

According to one aspect of the invention, a method is provided for a wireless receiver, the wireless receiver being in communication with a first wireless transmitter/receiver that pages a second wireless transmitter/receiver to establish a communication between the first wireless transmitter/receiver and the second wireless transmitter/receiver, the wireless receiver and the first wireless transmitter/receiver being movable to a plurality of different locations. At each of the plurality of different locations of the wireless receiver, and for each establishment of a communication between the first wireless transmitter/receiver and the second wireless transmitter/receiver, the location of the wireless receiver and the first wireless transmitter/receiver is recorded. A plurality of packets transmitted by the first wireless transmitter/receiver and transmitted by the second wireless transmitter/receiver are received. For each of the received plurality of packets, reception times of packets transmitted by the first wireless transmitter/receiver and the second wireless transmitter/receiver are recorded. If a predefined amount of time has passed without receipt of a packet, calculating a time delay, td, based at least in part on the recorded reception time of each packet, and determining a location of the second wireless transmitter/receiver based on the calculated time delay. A target location of the second wireless transmitter/receiver is determined based on a plurality of the determined locations of the second wireless transmitter/receiver.

According to this aspect, in some embodiments, the first wireless transmitter/receiver and the second wireless transmitter/receiver are Classic Bluetooth Basic Rate devices. In some embodiments, the establishment of a communication between the first wireless transmitter/receiver and the second wireless transmitter/receiver is initiated by the sending of a Page message from the first wireless transmitter/receiver to the second wireless transmitter/receiver, and the plurality of packets transmitted by the first wireless transmitter/receiver and transmitted by the second wireless transmitter/receiver is increased by the transmission of a Link Management Protocol (LMP) name request from the first wireless transmitter/receiver to the second wireless transmitter/receiver. In some embodiments, the time delay, td, is determined as td=(Shift Time, MOD (2×slot time)–slot time)/2, wherein Shift Time, MOD (2×slot time)>slot time, and where "Shift Time" is a recorded reception time of a packet referenced to the recorded reception time of a first received packet by the wireless receiver, and "slot time" is a time division multiplex (TDM) slot duration of a wireless system comprising the wireless receiver, the first wireless transmitter/receiver and the second wireless transmitter/receiver.

In another embodiment, for each of the received plurality of packets, a packet type is identified, and if the identified packet type is one of a first packet type and a second packet type, the reception time of the identified packet is recorded. In some embodiments, the first packet type is a POLL and the second packet type is a NULL.

According to another aspect, a wireless receiver is provided and is configured to receive packets from a first wireless transmitter/receiver that pages a second wireless transmitter/receiver to establish a communication between the first wireless transmitter/receiver and receive packets from the second wireless transmitter/receiver. The wireless receiver and the first wireless transmitter/receiver are movable to a plurality of different locations. The wireless receiver includes a receiver configured to receive a plurality of packets transmitted by the first wireless transmitter/receiver and transmitted by the second wireless transmitter/receiver at each of the plurality of different locations of the wireless receiver and for each establishment of a communication between the first wireless transmitter/receiver and the second wireless transmitter/receiver. The wireless receiver further includes processing circuitry configured to, at each of the plurality of different locations of the wireless receiver, record the location of the wireless receiver and the first wireless transmitter/receiver. The processing circuitry is further configured to, for each of the received plurality of packets, record reception times of packets transmitted by the first wireless transmitter/receiver and the second wireless transmitter/receiver. If a predefined amount of time has passed without receipt of a packet, the processing circuitry is configured to calculate a time delay, td, based at least in part on recorded reception time of each packet, and determine a location of the second wireless transmitter/receiver based on the calculated time delay. The processing circuitry is further configured to determine a target location of the second wireless transmitter/receiver based on a plurality of the determined locations of the second wireless transmitter/receiver.

In another embodiment, the wireless receiver is a Classic Bluetooth Basic Rate device. In some embodiments, the establishment of a communication between the first wireless transmitter/receiver and the second wireless transmitter/receiver is initiated by the sending of a Page message from the first wireless transmitter/receiver to the second wireless transmitter/receiver, and the plurality of packets transmitted by the first wireless transmitter/receiver and transmitted by the second wireless transmitter/receiver is increased by the transmission of a Link Management Protocol (LMP) name request from the first wireless transmitter/receiver to the second wireless transmitter/receiver. In some embodiments, the processing circuitry is further configured to determine the time delay, td, as td=(Shift Time, MOD (2×slot time)–slot time)/2, wherein Shift Time, MOD (2×slot time)>slot time, and where "Shift Time" is a recorded reception time of a packet referenced to the recorded reception time of a first received packet by the wireless receiver, and "slot time" is a time division multiplex (TDM) slot duration of a wireless system comprising the wireless receiver, the first wireless transmitter/receiver and the second wireless transmitter/receiver.

In another embodiment, the processing circuitry is further configured to, for each of the received plurality of packets, identify a packet type, and if the identified packet type is one of a first packet type and a second packet type, record the reception time of the identified packet. In another embodiment, the first packet type is a POLL and the second packet type is a NULL.

According to another aspect, a wireless communication system movable to a plurality of different locations is provided. The wireless communication system includes a first wireless transmitter/receiver configured to initiate a paging sequence between the first wireless transmitter/receiver and a second wireless transmitter/receiver to establish a communication between the first wireless transmitter/receiver and the second wireless transmitter/receiver. The wireless communication system further includes a wireless receiver, including a receiver configured to receive a plurality of packets transmitted by the first wireless transmitter/receiver and transmitted by the second wireless transmitter/receiver at each of the plurality of different locations of the wireless receiver. The wireless communication system further includes a processing circuitry configured to, at each of the plurality of different locations of the wireless receiver, record the location of the wireless receiver and the first wireless transmitter/receiver. The processing circuitry is further configured to, for each of the received plurality of packets, record reception times of packets transmitted by the first wireless transmitter/receiver and the second wireless transmitter/receiver. The processing circuitry is also configured to, if a predefined amount of time has passed without receipt of a packet, calculate a time delay, td, based at least in part on the recorded reception time of each packet, and determine a location of the second wireless transmitter/ receiver based on the calculated time delay. The processing circuit is further configured to determine a target location of the second wireless transmitter/receiver based on a plurality of the determined locations of the second wireless transmitter/receiver.

In one embodiment, the wireless receiver, the first wireless transmitter/receiver and the second wireless transmitter/receiver are Classic Bluetooth Basic Rate devices. In another embodiment, the first wireless transmitter/receiver is configured to initiate a Remote Name Request after initiating the paging sequence between the first wireless transmitter/receiver and the second wireless transmitter/receiver, and a communication connection between the first wireless transmitter/receiver and the second wireless transmitter/receiver is established.

In some embodiments, the processing circuitry of the wireless receiver is further configured to determine the time delay, td, as td=(Shift Time, MOD (2×slot time)−slot time)/2, wherein Shift Time, MOD (2×slot time)>slot time, and where "Shift Time" is a recorded reception time of a packet referenced to the recorded reception time of a first received packet by the wireless receiver, and "slot time" is a time division multiplex (TDM) slot duration of a wireless system comprising the wireless receiver, the first wireless transmitter/receiver and the second wireless transmitter/receiver.

In another embodiment, the processing circuitry of the wireless receiver is further configured to, for each of the received plurality of packets, identify a packet type, and if the identified packet type is one of a first packet type and a second packet type, record the reception time of the identified packet. In some embodiments, the first packet type is a POLL and the second packet type is a NULL.

In other embodiments, the wireless receiver and the first wireless transmitter/receiver are co-located when in operation. In some embodiments, the wireless communication system further comprises a platform location module configured to provide the location of the wireless receiver, a general-purpose processor, and a time clock configured to provide a current time to the wireless communication system, which are interconnected to the first wireless transmitter/receiver and the wireless receiver.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a diagram that shows the format of the unique Bluetooth Device Address (BD_ADDR);

FIG. 4 is a table of the initial messaging between master and slave during start up for the paging substates;

FIG. 7 is an example table of the protocol capture of the packet exchanges described above with reference to FIG. 6 where the protocol analyzer is located close to the master;

FIG. 8 is a table derived from the exemplar table FIG. 7;

FIG. 11 is a flow diagram of a process of another embodiment of the disclosure for determining the target location of a second wireless device based on a plurality of determined locations of the second wireless transmitter/receiver.

DETAILED DESCRIPTION

Figure 1:
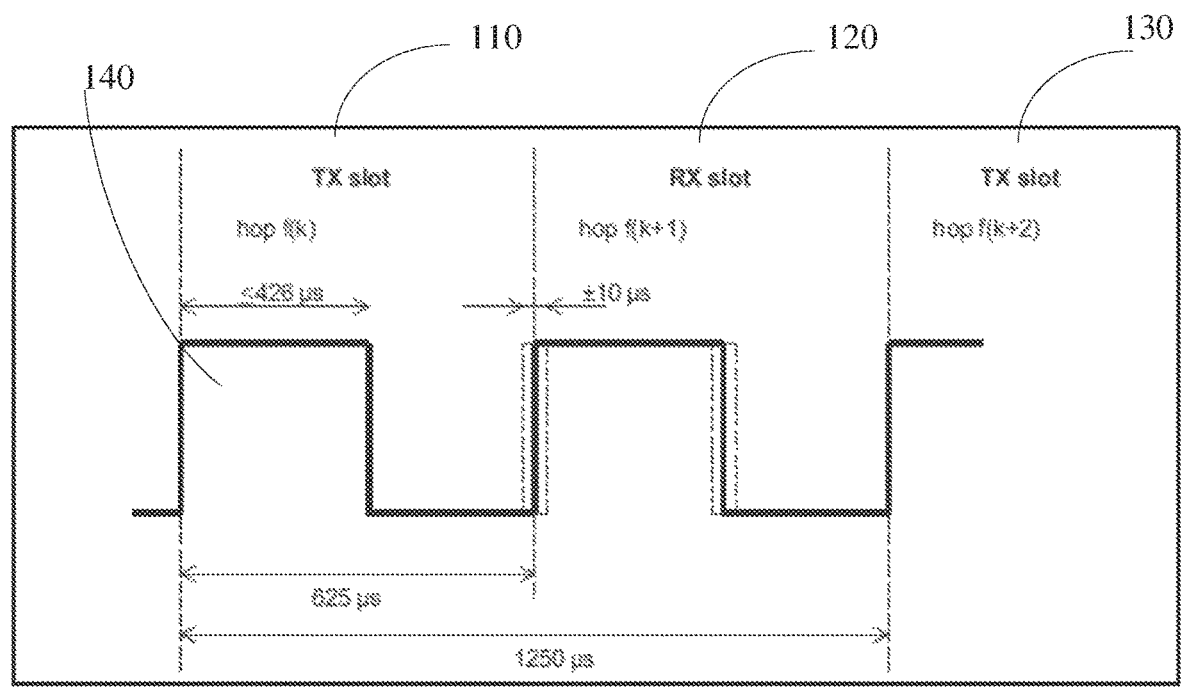
FIG. 1 is a diagram of the receive/transmit (RX/TX) cycle for the master transceiver in normal mode for single-slot packets.

Method and devices are disclosed that geo-locates a BR Bluetooth device by initializing, establishing and terminating a Bluetooth connection without the need for any interaction by the user of the device.

The default state of a Bluetooth device is the Standby state. In this state, the device may be in a low-power mode. A device may leave the Standby state to scan for page or inquiry messages or to page or inquire itself. In order to establish new connections, the paging procedure or the synchronization scan procedure is used. Only the Bluetooth device address, as discussed above with reference to FIG. 3, is required to set up a connection using the paging procedure. A device that establishes a connection using a page procedure will automatically become the master of the connection.

In a Connection state, the connection has been established and packets may be sent back and forth and the device uses the basic or adapted channel hopping sequence. A device can transition to the Connection state from the page/page scan substates and starts with a Poll packet, sent by the master that verifies the switch to the master's timing and channel frequency hopping.

A device can scan for page messages from the Standby state or the Connection state. When a device leaves the Standby mode to scan for page messages it shall select the scan frequency according to the page hopping sequence determined by the device's BD_ADDR.

FIG. 4 is a table of the initial messaging between a master and a slave during start up for the paging substates. In step 1, 401, the master device is in the "page" substate and the slave device in the "page scan" substate. It is assumed that in this step 401 that the page message sent by the master is received correctly by the slave. On receiving the page message, in step 2, 402, the slave device transmits a slave page response message (the slave's device access code) and enters the "slave response" substate. The master waits for a reply from the slave and when this arrives in step 2, 402, the master enters the "master response" substate in step 3, 403. In step 3, 403, the slave awaits the arrival of a Frequency Hopping Sequence (FHS) packet from the master and if it is received, in step 4, 404, then the slave responds with a slave page response message to acknowledge the reception of the FHS packet. During the initial message exchange, steps 1 to 4, 401 to 404, all parameters are derived from the slave's device address, BD_ADDR, and that only the page hopping and page response hopping sequences are used (derived from the slave's device address).

Finally, in step 5, 405, the slave device enters the Connection state and the slave device uses the master's clock and the master's BD_ADDR to determine the basic channel hopping sequence and channel access code. The FHS packet in step 3, 403, contains all the information for the slave to construct the channel access code. The connection mode starts with a Poll packet transmitted by the master in step 5, 405, and the slave, in step 6, 406, may reply with any type of packet but a Null packet is generally used for this response.

Figure 5:
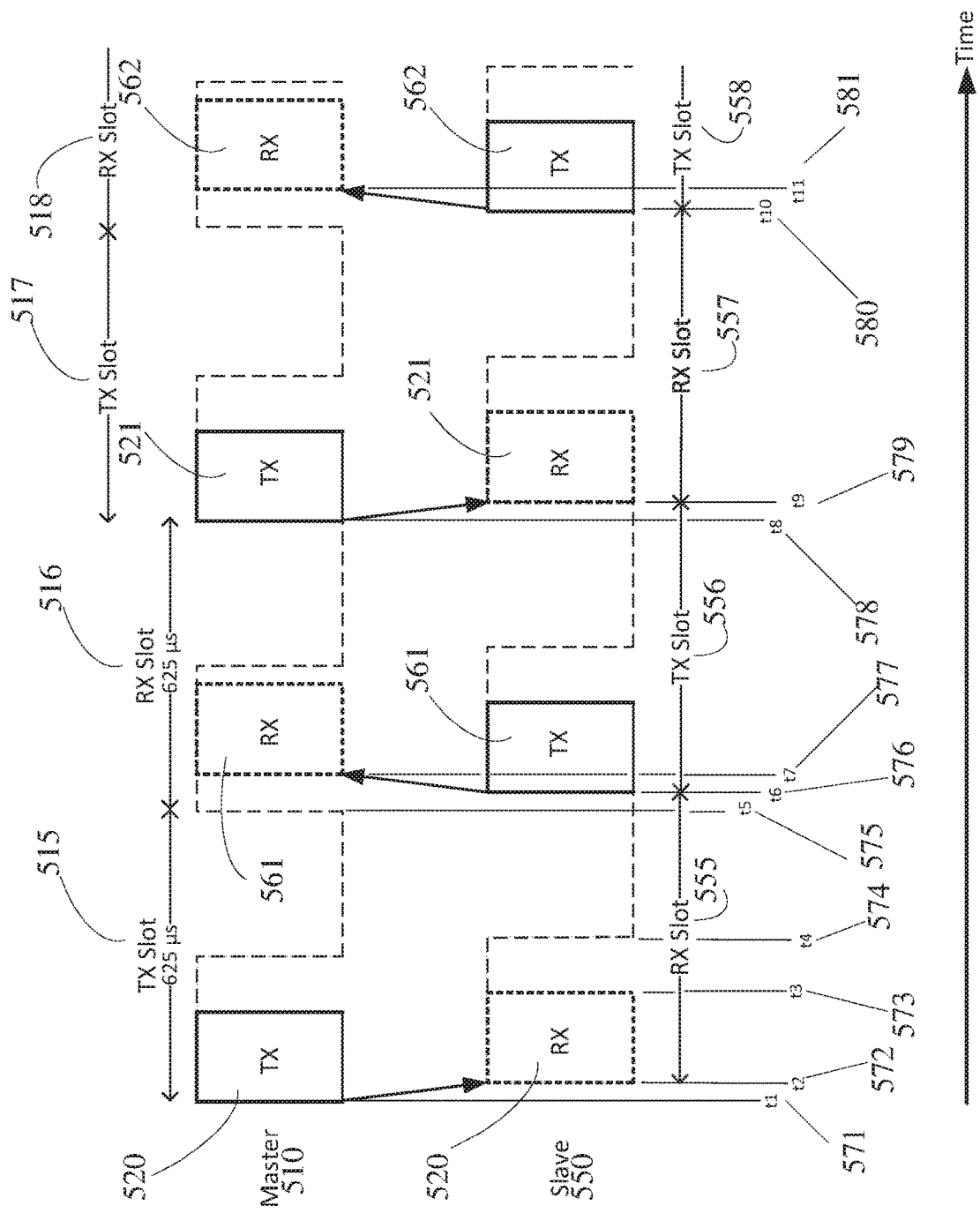
FIG. 5 is a timing diagram that describes the ranging method of the present disclosure that may be used to determine the distance between two Bluetooth devices, a Master and a Slave.

FIG. 5 is a timing diagram that describes the ranging method of the present disclosure that may be used to determine the distance between two Bluetooth devices, a Master device 510 (also referred to herein as "Master 510") and a Slave device 550 (also referred to herein as "Slave 550"). The Master 510 has a TX Slot 515 followed by an RX Slot 516, each nominally 625 µs in duration. The TX Slot 515 starts at time t1 571 and the RX Slot 516 starts at time t5 575. Conversely the Slave 550 has an RX Slot 555 followed by a TX Slot 556, each nominally 625 µs in duration. The RX Slot 555 starts at time t2 572 and the TX slot starts at time t6 576. At time t1 571, the Master 510 may transmit a packet 520 to the Slave 550. This transmission packet 520 may be received at the Slave 550 at time t2 572. The time (t2-t1) is the propagation time of the packet 520 in travelling the distance between the Master 510 and the Slave 550. The Slave 550 may then respond to packet 520 with packet 561 in the next TX slot 556 at time t6 576. This packet 561 may be received by the Master 510 at time t7 577, in the corresponding RX Slot 516 of the Master 510. The time (t7-t6) is the propagation time of the packet 561 in travelling the distance between the Slave 550 and the Master 510. The time t1 571 is the TOD of packet 520 and the TOA of the response packet 561 is t7 577. The turnaround time is (t6-t2), the slot time of the Slave 550, nominally 625 µs. Hence, the time delay, td, which is equal to (t2-t1) and (t7-t6), between the Master 510 and the Slave 550 may be determined from the calculations $$td=[t7-t1-(t6-t2)]/2 \text{ or } td=(TOA-TOD-\text{Slot Time})/2 \quad (1)$$

and the distance between the Master 510 and the Slave 550 is then td×c, where c is the speed of light. The delta time (t7-t1) or (TOA-TOD) corresponds to the time that the Master 510 receives packet 561 minus the time that the Master 510 transmitted packet 520.

At time t8 578, at the start of the Master's next TX slot 517, another packet 521 may be transmitted by the Master 510 to the Slave 550. This packet may be received by the Slave 550 at time t9 579 and at the start of the Slave's next TX slot 558, at time t10 580, the Slave 550 may transmit the response packet 562 to the Master 510 which may be received by the Master 510 at time t11 581. For this packet exchange 521 and 562 the time delay, td', which is equal to (t9-t8) and (t11-t10), between the Master 510 and the Slave 550 may be determined from the calculation $$td'=[t11-t8-(t10-t9)]/2, \quad (2)$$

where t11 is the TOA of packet 562, t8 is the TOD of packet 521 and (t10-t9) is the Slot time of the Slave 550. The delta time (t11-t8) corresponds to the time that the Master 510 receives packet 562 minus the time that the Master 510 transmitted packet 521.

If the position of the Master is known, then by deriving values for td that result from the exchange of a number of packets between the Master 510 and the Slave 550, the distance from the Master 510 to the Slave 550 may be calculated. If the Master 510 moves in relation to the Slave 550, such that the distance from the Master 510 to the Slave 550 is calculated for varying angles between the two, e.g. the Master is in a vehicle or is airborne, then the location of the Slave may be calculated. Such methods for calculating a location based on a series of time delay measurements taken at varying angles between a master and slave are known in the art and are therefore not described herein.

The more packets that are exchanged between the Master 510 and the Slave 550, the better the accuracy of the calculated distance td×c. Basically, if the measuring error of td in each packet is Δt, then if there are N packet exchanges, the error is reduced by the square root of N. For example, if td is measured in microseconds, the maximum measurement error is ±1 µs. If td is measure over 100 packets, then the measurement error is reduced by 10, i.e. ±0.1 µs.

As described above with reference to FIG. 4 a targeted Bluetooth device may be paged by another Bluetooth device. The targeted Bluetooth device will act as the slave and the Bluetooth device that initiates the page acts as the master. Once the sequence of exchanges as described above with reference to FIG. 4 has completed, i.e. the master transmits the Poll packet in step 5 405, then a brief temporary connection may occur.

Initializing, establishing and terminating a Bluetooth connection without the need for any interaction by the user of the device implies that an explicit ACL Connection should not be established. As discussed above with reference to FIG. 5, in order to measure the distance between two Bluetooth devices a sufficient number of packets are required to be exchanged in order to produce a required accuracy.

A method is disclosed that sets up a temporary connection for a BR device, causes a number of packets to be exchanged and then automatically disconnects; all without the need of any user participation. The user of the targeted device is unaware of the process.

Figure 6:
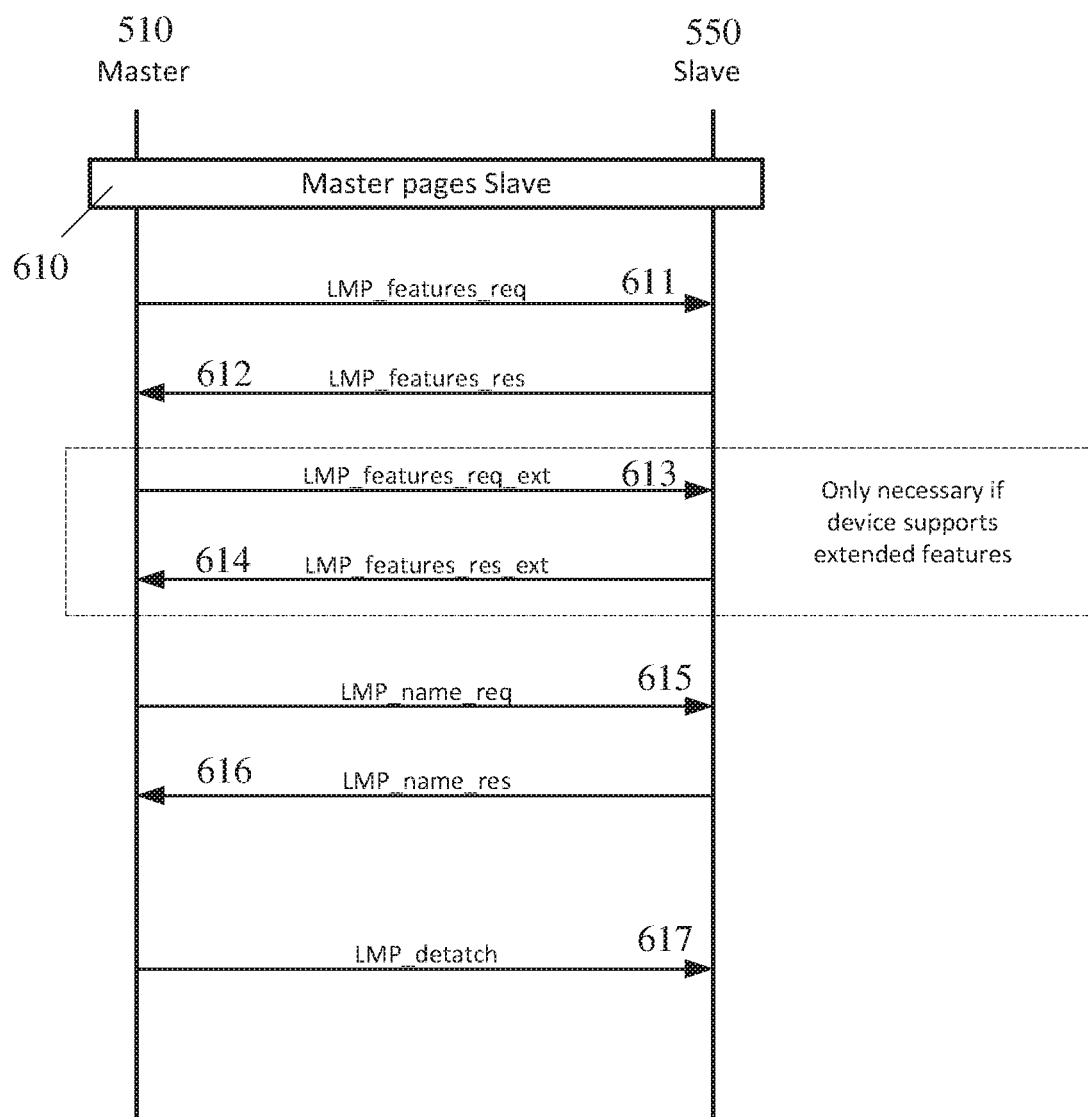
FIG. 6 is a diagram describing the sequence of packet exchanges between a master and a slave when the master uses a Link Management Protocol (LMP) Name Request connection.

FIG. 6 is a diagram describing the sequence of packet exchanges between a Master 510 and a Slave 550 when the Master 510 uses an LMP Name Request connection. The sequence starts 610 when the Master 510 pages the Slave 550 as discussed above with reference to FIG. 4. Upon receipt of a packet, step 406, from the Slave 550, the Master 510 may transmit an LMP_features_req request packet, 611, to the Slave 550. The Slave 550 may then respond with an LMP_features_res response packet 612. If extended features are supported, then an exchange of LMP_feature_req_ext 613 and LMP_feature_res_ext 614 request and response packets may take place. The Master 510 may then transmit an LMP_name_req request packet 615 and the Slave 550 may respond with an LMP_name_res response packet 616. As an ACL Connection is not existing between the Master 510 and the Slave 550, after receiving the LMP_name_res response packet 616, the Master 510 may transmit an LMP_detach packet 617 to disconnect.

During the exchange of packets described above with reference to FIG. 6, in order to maintain the channel hopping sequence and synchronization, in addition to the packets 611 to 617 the Master 510 and the Slave 550 may transmit Poll packets and Null packets respectively. A Bluetooth protocol analyzer may be used to capture the Bluetooth packets. In practice, such a protocol analyzer cannot be relied upon to capture every packet and allowance should be made accordingly.

FIG. 7 is an example table of the protocol capture of the packet exchanges described above with reference to FIG. 6 where the protocol analyzer is located in the same general proximity, e.g., at the same location, as the Master 510.

Figure 2:
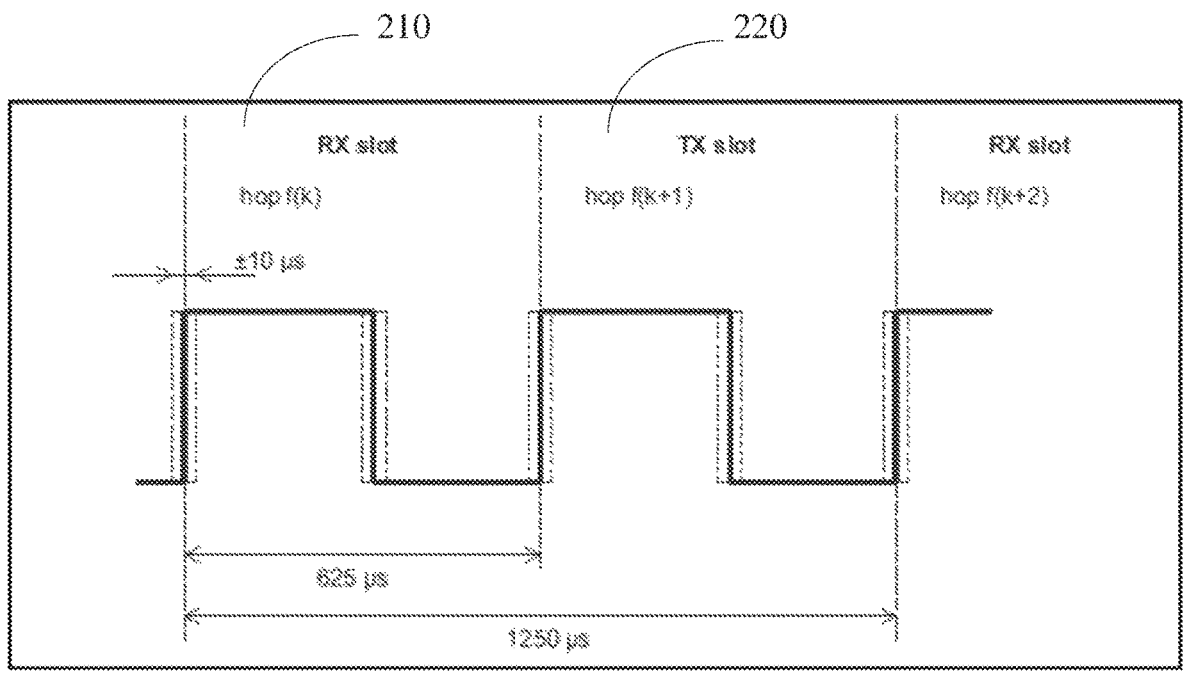
FIG. 2 is a diagram of the receive/transmit (RX/TX) cycle of the slave transceiver.

Column 710 displays the channel number. Column 711 displays the packet type. Column 712 displays the device, Master 510 or Slave 550 that transmitted the packet. Column 713 displays the packet description of the transmitted packet. Column 714 displays the time that the packet was received, TOA. Column 715 displays the delta time which is the time that the present packet was detected after the time of the previously detected packet. Column 716 displays the shift time which is the time that the present packet was received after the first received packet. At line 720, the FHS packet is displayed that corresponds to the Step 3 403 of the paging sequence discussed above with reference to FIG. 4. At line 721 the Poll packet is displayed that corresponds to Step 5, 405 of the paging sequence described above with reference to FIG. 4, and at line 722 the Slave 550 responds with a Null packet. At lines 725, 730, 735/745, 740/750, 755, 760, and 765 the LMP packet descriptions corresponding to packets 611, 612, 613, 614, 615, 616, and 617 are displayed. As discussed above with reference to FIG. 6 several Poll packets, transmitted by the Master 510, and Null packets, transmitted by the Slave 550, are also displayed. For example, at lines 751 and 752 a Poll packet transmitted by the master on channel 64 is followed by a Null packet transmitted by the slave, respectively. The corresponding delta times, column 715 at line 752, is 627 µs, which, as discussed above with reference to FIGS. 1 and 2, relates to the nominal 625 µs slot times 110 and 220. At lines 736, 737, 738, and 739 Poll packets, transmitted by the master, were detected and displayed. The corresponding delta times at column 715 lines 736, 737, 738 and 739, is 1250 µs, which, as discussed above with reference to FIG. 1, relates to the 1250 µs time between TX slots 110 and 130.

As discussed above with reference to FIG. 5 and FIG. 7, the delta time readings will be in accordance with the time slots and the distance of the Slave 550 from the Master 510. All the packet types leading up to an LMP_name_req request packet 615 and the LMP_name_res response packet 616 are all single slot packets hence the time deltas ideally would be the slot time, nominally 625 µs, plus twice the propagation time, as discussed above with reference to FIG. 5.

FIG. 8 is a table derived from the example table 700 in FIG. 7. Columns Role 712, shift time 716 and delta time 715, in µs, are as shown in FIG. 7. Lines 820 and 821 both refer to packets transmitted by the Master 510. The delta time for line 821 is 624 whereas the delta time for line 821 is 1250 µs. Line 830 refers to a packet transmitted by the Master 510 and line 831 refers to a packet transmitted by the Slave 550. In line 830 the delta time is 623 and in line 831 the delta time is 626 µs. It is not possible to distinguish between packets transmitted by the Master 510 or the Slave 550 by reference to the delta time. In order to distinguish between packets that were transmitted by the Master 510 or the Slave 550, the shift time, modulus (1250) is calculated. The shift time, modulus 1250, is shown in column 810. In column 810 lines 820, 821, and 830, the value is 0, indicating that the packet was transmitted by the Master 510, whereas in column 810 lines 825, 827, and 831 the value is nominally the slot time plus twice the propagation time, indicating that the packet was transmitted by the Slave 550. Hence, the propagation time, td, may be calculated from the values as given in column 810:

$$td = (\text{Shift Time MOD } (1250) - \text{slot time})/2 \text{ where}$$
$$\text{Shift Time MOD } (1250) > \text{slot time} \quad (3)$$

Figure 9:
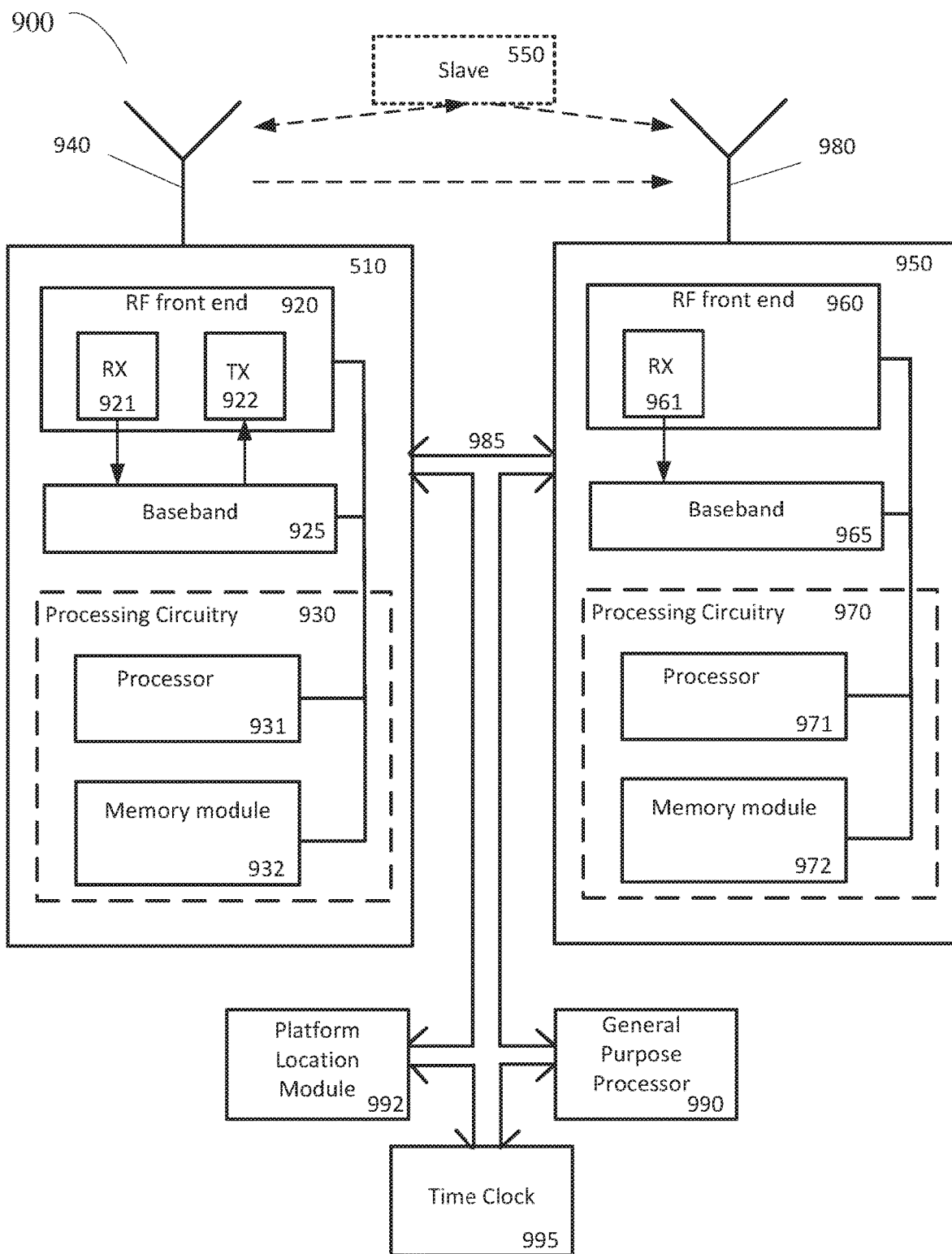
FIG. 9 illustrates a block diagram of an example wireless communication system which, according to an embodiment of the disclosure, may be configured to perform the functions described herein.

FIG. 9 illustrates a block diagram of an example wireless communication system 900 which, according to an embodiment of the disclosure, may be configured to perform the functions described herein. The embodiment described herein is that where wireless communication system 900 includes the Master 510 that operates as a wireless transmitter/receiver, and a wireless receiver 950 that performs the functions of a Bluetooth protocol analyzer as discussed above with reference to FIGS. 5, 6 and 7. Master 510 may be any device configured to wirelessly receive signals and transmit signals, and may be configured to execute any of the methods of the Bluetooth Specification. Wireless receiver 950 may be any device configured to wirelessly receive signals, and may be configured to execute any of the methods of the Bluetooth Standard. The wireless communication system 900 may also include a general purpose processor 990 and a time clock 995 which are interconnected to the two stations (Master 510 and wireless receiver 950) by a data bus 985.

In some embodiments, the Master 510 includes an RF front end 920 that includes an RF transmitter 922 and an RF receiver 921, a baseband 925, and processing circuitry 930 that includes processor 931 and memory module 932. The Master 510 also includes one or more wireless antennas such as wireless antenna 940. The RF receiver 921 may perform the functions of low noise amplification, filtering and frequency down conversion for the reception of Bluetooth packets via the antenna 940. The RF transmitter 922 may perform the functions of up conversion and amplification for the transmission of Bluetooth packets via the antenna 940. The baseband 925 may perform the functions of modulation, de-modulation, coding and de-coding, as described in the Bluetooth Specification. In some embodiments, the processing circuitry 930 and/or the processor 931 may comprise integrated circuitry for processing and/or control, e.g., one or more processors and/or processor cores and/or Field Programmable Gate Arrays (FPGAs) and/or Application Specific Integrated Circuitry (ASICs) configured to execute programmatic software instructions. In some embodiments the some or all of the functions of the RF front end 920 may be performed by the processing circuitry 930. The processing circuitry 930 may be configured to control any of the methods and/or processes described herein and/or to cause such methods, and/or processes to be performed, e.g., by the baseband 925 and the RF front end 920. The memory module 932 may be configured to store data, programmatic software code and/or other information described herein. In some embodiments, the software may include instructions that, when executed by the processing circuitry 930, causes the processing circuitry 930 to perform the processes described herein with respect to the wireless transmitter/receiver 510.

In some embodiments, the wireless receiver 950 includes an RF front end 960 that includes a receiver 961, a baseband 965 and processing circuitry 970 that includes a processor 971 and a memory module 972, and one or more wireless antennas such as wireless antenna 980. The RF front end 960 and receiver 961 may perform the usual functions of an RF receiver front end such as low noise amplification, filtering and frequency down conversion so as to condition the received signal suitable for inputting to the baseband 965. The baseband 965 may perform the functions of demodulation and decoding so as to condition the received signal suitable for inputting to the processing circuitry 970. In some embodiments the RF front end 960 and/or the processing circuitry 970 may comprise integrated circuitry for processing and/or control, e.g., one or more processors and/or processor cores and/or FPGAs and/or ASICs configured to execute programmatic software instructions. In some embodiments the functions of the RF receiver 961 may be performed by the processing circuitry 970. The processing circuitry 970 may be configured to control any of the methods and/or processes described herein and/or to cause such methods, and/or processes to be performed, e.g., by the wireless receiver 950. The memory module 972 is configured to store data, programmatic software code and/or other information described herein. In some embodiments, the software may include instructions that, when executed by the processing circuitry 970, causes the processing circuitry 970 to perform the processes described herein with respect to the wireless receiver 950.

According to this embodiment of the disclosure the wireless receiver 950 may be configured to measure and monitor an input signal's attribute, such as may include one or more packets transmitted by wireless transmitter/receiver 510 for the purpose of paging another device, as discussed above with reference to FIG. 4 and packets transmitted for the purpose of soliciting a remote name request, as discussed above with reference to FIGS. 6 and 7. Such packets may include Poll and Null packets. Also the wireless receiver 950 may be configured to measure and monitor an input signal's attribute, such as may include one or more packets transmitted by another Bluetooth device that has been paged by the wireless transmitter/receiver 510, as discussed above with reference to FIG. 4 and packets transmitted by that other Bluetooth device in responding to the soliciting a remote name request by the wireless transmitter/receiver 510 as discussed above with reference to FIGS. 6 and 7. Such packets may include Poll and Null packets. The memory module 972 may store instructions for executing any method mentioned in the Bluetooth Specification, input signals, and results of processing of the processor 971 signals to be outputted and the like.

According to an embodiment of the disclosure the RF transmitter/receiver 510 may be configured to transmit and receive signals and the processing circuitry 930 may be configured to prepare the transmitted and received signal attributes based upon the Bluetooth Specification. Such packets may include Null, Poll, FHS and DM1 packets that are to be transmitted and received by a wireless station that is based upon the Bluetooth Specification. The memory module 932 may store instructions for executing any method mentioned in the specification, input signals, and results of processing of the processor 931, signals to be outputted and the like.

To aid understanding of the present embodiments, Slave 550 is shown in FIG. 9. Slave 550 is not an element of the example wireless communication system 900. Slave 550 may receive transmissions from the Master 510, and transmissions from the Slave 550 may be received by the wireless Master 510 and by the wireless receiver 950.

According to another embodiment of the disclosure, the wireless receiver 950 may be configured to receive the transmissions of another wireless communication device, and in particular Slave 550, and the processing circuitry 970 may be configured to monitor an attribute of the Slave 550, and determine the value of the time of arrival of packets from the Slave 550. In addition, according to an embodiment of the disclosure the wireless receiver 950 may be configured to measure the times of departure of the transmissions from the wireless Master 510. These times may be accomplished by outputting a trigger that is timed to coincide with the reception packet from the other wireless device or the Master 510. This trigger may then be used to read the time from the time clock 995. Time clock 995 may have a precision that is higher than the internal timer that is part of the wireless receiver 950.

According to an embodiment of the disclosure the Master 510 may be configured to transmit and receive packets to and from another wireless communication device and the processor 931 may be configured to prepare the attributes of the packet to be transmitted.

According to an embodiment of the disclosure, a general purpose processor 990 may be used to control the operations of the communication system 900 and in particular the Master 510 and wireless receiver 950. The general purpose processor 990 may also carry out the various calculations as described in this disclosure and may also prepare the measurement results for disclosure to an operator or user. In some embodiments, the general purpose processor 990 can be a computing device such as a tablet computer, desktop computer, laptop computer, or distributed computing, e.g. cloud computing. In some embodiments, the general purpose processor 990 can be a processor/CPU in the tablet, laptop computer, desktop computer, or distributed computing environment, etc. In some embodiments the general purpose processor 990 may comprise integrated circuitry for processing and/or control, e.g., one or more processors and/or processor cores and/or FPGAs and/or ASICs configured to execute programmatic software instructions and may include a memory module to execute programmatic code stored in the general purpose processor or another device. It is also noted that the elements of the measuring station 990 can be included in a single physical device/housing or can be distributed among several different physical devices/housings. Processor 990 may be used to perform the various calculations as described in this disclosure and may also prepare the measurement results for disclosure to an operator or user.

According to an embodiment of the disclosure, a platform location module 992 may be used to input, via the data bus 985, to the general purpose processor 990 and/or the processing circuitry 970 the location of the platform that is carrying the wireless communication device 900. The platform location module 992 may comprise navigation equipment such as a GPS receiver.

Figure 10:
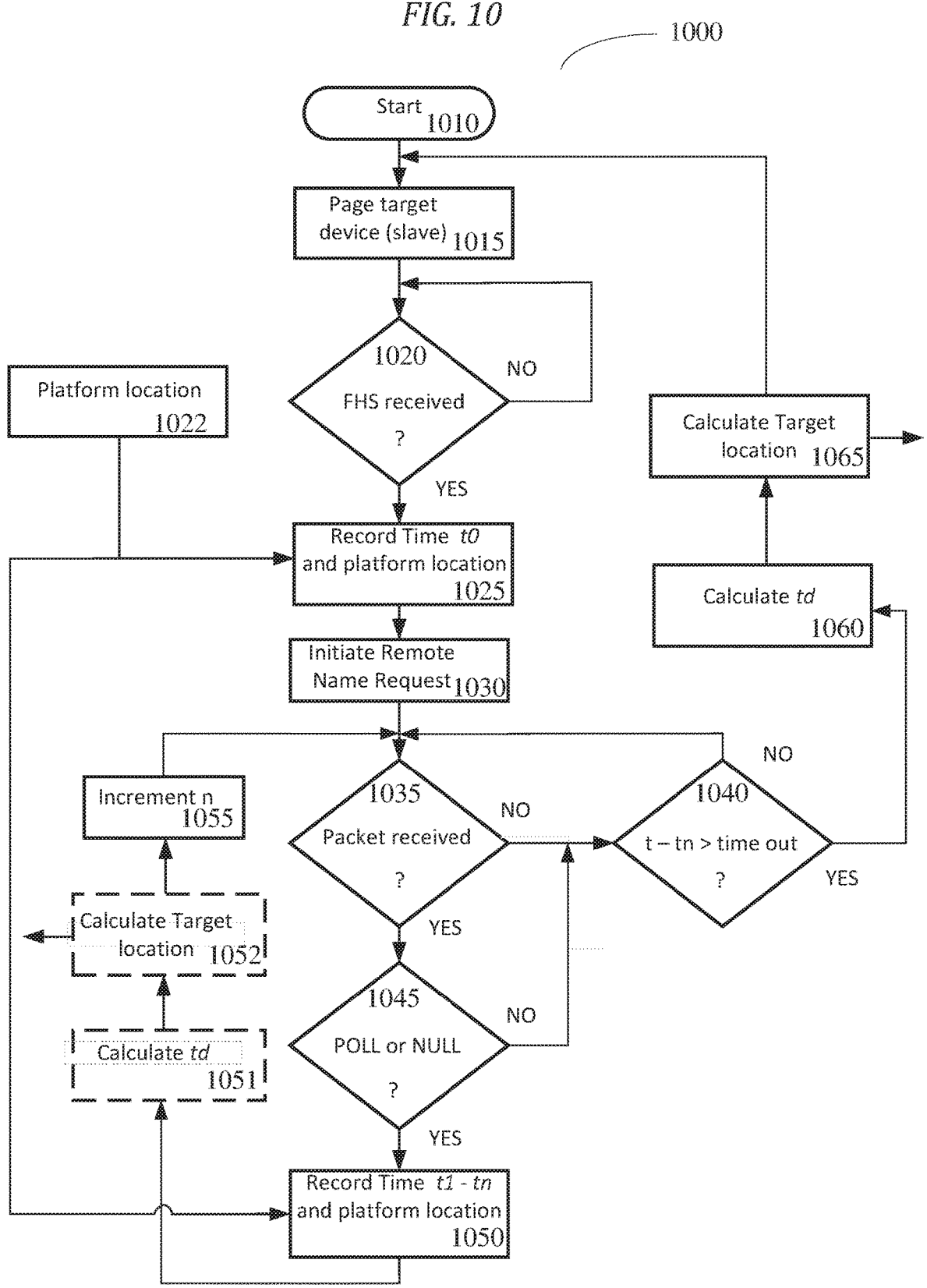
FIG. 10 is a flow diagram of a process of one embodiment of the disclosure for determining the location of a device.

FIG. 10 is a flow diagram of a process 1000 of one embodiment of the disclosure for determining the location of a Bluetooth device. Process 1000 may start with step 1015 where the Master 510 (acting as a wireless receiver/transmitter), may initiate the paging sequence, as discussed above with reference to FIG. 4, with the target device, Slave 550. Step 1015 may be followed by step 1020 where the wireless receiver 950, performing the functions of a Bluetooth protocol analyzer, is waiting until the reception of the FHS packet, as discussed above with reference to FIG. 4 step 403. When the FHS packet is received, step 1020 may be followed by step 1025 where the reception time is recorded as time to, together with the location of the wireless communication system 900 which is provided by the platform location module 992, step 1022. Step 1025 may be followed by step 1030 where the Master 510, performing the functions of the Master 510, may initiate the sequence of packet exchanges for the remote name request with the target device, Slave 550, as discussed above with reference to FIG. 6 and FIG. 7. Step 1030 may be followed by step 1035 where the wireless receiver 950, performing the functions of a Bluetooth protocol analyzer, receives packets transmitted by the Master 510 and responding packets transmitted by the target device, Slave 550 as discussed above with reference to FIG. 7. If packets are received, then step 1035 may be followed by step 1045 where a check is carried out to determine if the received packet is a Poll or a Null and if so, the reception time is recorded as time t1, together with the location of the wireless communication system 900, which is provided by the platform location module992, step 1022. Step 1045, to record the times of only Poll and Null packets is an optional step. As discussed above with reference to FIG. 7, all the packets exchanged during a remote name request sequence are single slot packets, and hence the reception times of all the received packets may be recorded. Polls and Nulls, however, are very common and a Null tends to always follow a Poll, and hence, the timing of the two packets is reliable. Step 1050 may be followed by step 1055 where the timing reference is incremented and the process returned to step 1035. The sequence of steps 1035, 1045 1050 and 1055 may result in a record of packet reception times, t1 to tn at step 1050. At step 1035, if a packet is not detected, step 1035 may be followed by step 1040 where a check is made on the time between packets.

As discussed above with reference to FIG. 6, the remote name sequence may terminate after the LMP_detach packet 617 is sent. A timeout value, Ttimeout, is set and if the current time, t, is greater than the last recorded packet time, tn, by a value of Ttimeout or greater, then it may be assumed that the remote name sequence has completed. A value in the order of 7 seconds may be used for Ttimeout. If at step 1040 it is determined that the sequence has terminated, then step 1040 may be followed by step 1060 where the time delay td may be calculated based upon the recorded packet times, to tn, as discussed above with reference to FIG. 5 and FIG. 8. Similarly, if at step 1045 it is determined that the sequence has terminated, due to the absence of Polls or Nulls, then step 1040 may be followed by step 1060. Step 1060 may be followed by step 1065 where the location of the target device, Slave 550 may be calculated based upon previous sets of times together with the platform location information. These calculations may be performed by the general purpose processor 990 and/or the Processing Circuitry 930 and/or the Processing Circuitry 970. The process may then return to step 1015.

Although it might be possible to not send the LMP_detach packet and hence attempt to maintain the connection longer, in this circumstance there exists a possibility that the Slave 550 will re-synchronize and the packet times may be affected. In another embodiment of the disclosure, the calculation of td, in step 1060, and the calculation of the target location, in step 1065, may be carried out as each value of tn, together with the platform location, is recorded. In this case these steps, 1051 and 1052 may be added between steps 1050 and 1055.

In order for the wireless receiver 950, that is performing the functions of a protocol analyzer, to follow the hopping sequence, the FHS packet needs to be detected. Thus, for any burst of packets staring with the polling sequence, the wireless receiver 950, performing the functions of a Bluetooth protocol analyzer should receive the FHS packet in order to follow the hopping sequence of the subsequent packets. In the embodiment described above with reference to FIG. 10, at step 1020, the time of the detection of the FHS packet is recorded as the first packet time, t0. As discussed above with reference to FIG. 8 and equation (3), the first packet time, t0 should refer to a packet transmitted by the Master 510. Poll packets are transmitted by the Master 510 and Null packets are transmitted by the Slave 550 and hence the reception times of just Polls and Nulls could be recorded, where the time of the detection of a Poll packet is recorded as the first packet time, t0.

As discussed above with reference to FIG. 6, the remote name request sequence ends with an LMP_detach packet 617. A series of several Polls and Nulls may continue before the connection is terminated. Step 1040 determines when the connection is terminated and if so determined, by returning the process to step 1015, a new Page and remote name request sequence is started. In each sequence, starting and returning to step 1015 the number of packets, mostly Polls and Nulls that are transmitted, may be in the order of 200. By this means, repetitive bursts of packets are transmitted, separated by a time set by the Ttimeout in step 1040 enabling the calculation of the location of the target device, Slave 550. This sequence of bursts of packets takes place without any user intervention and without any indication to the user of the target device, Slave 550.

A process 1100 of another embodiment of the disclosure for determining the target location of a second wireless device based on a plurality of determined locations of the second wireless transmitter/receiver is described with reference to FIG. 11. At each of the plurality of different locations of the wireless receiver, and for each establishment of a communication between the first wireless transmitter/receiver and the second wireless transmitter/receiver, the location of the wireless receiver and the first wireless transmitter/receiver is recorded (step 1110). A plurality of packets transmitted by the first wireless transmitter/receiver and transmitted by the second wireless transmitter/receiver are received (step 1120). For each of the received plurality of packets, reception times of packets transmitted by the first wireless transmitter/receiver and the second wireless transmitter/receiver are recorded (step 1130). If a predefined amount of time has passed without receipt of a packet (step 1140), a time delay, td, is calculated based at least in part on the recorded reception time of each packet (step 1150), and a location of the second wireless transmitter/receiver is determined based on the calculated time delay (step 1160). A target location of the second wireless transmitter/receiver is determined based on a plurality of the determined locations of the second wireless transmitter/receiver.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the details of the Bluetooth protocol analyzer, the time recording of different packet types, the value of Ttimeout, variations in the details of the wireless communications system. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope which is limited only by the following claims.

What is claimed is:

1. A method for a wireless receiver, the wireless receiver being in communication with a first wireless transmitter/receiver that pages a second wireless transmitter/receiver to establish a communication between the first wireless transmitter/receiver and the second wireless transmitter/receiver, the wireless receiver and the first wireless transmitter/receiver being movable to a plurality of different locations, the method comprising:
    at each of the plurality of different locations of the wireless receiver, and for each establishment of a communication between the first wireless transmitter/receiver and the second wireless transmitter/receiver:
        determining the location of the wireless receiver and the first wireless transmitter/receiver;
        receiving a plurality of packets transmitted by the first wireless transmitter/receiver and transmitted by the second wireless transmitter/receiver;
        determining a reception time of each of the plurality of packets transmitted by the first wireless transmitter/receiver and the second wireless transmitter/receiver, the reception time of each of the plurality of packets having a corresponding time delay, td; and
    determining a target location of the second wireless transmitter/receiver based on the time delays.

2. The method of claim 1, wherein the establishment of a communication between the first wireless transmitter/receiver and the second wireless transmitter/receiver is initiated by a transmission of a Page message from the first wireless transmitter/receiver to the second wireless transmitter/receiver, and wherein the plurality of packets transmitted by the first wireless transmitter/receiver and transmitted by the second wireless transmitter/receiver is increased by a transmission of a Link Management Protocol (LMP) name request from the first wireless transmitter/receiver to the second wireless transmitter/receiver.

3. The method of claim 1, wherein the received plurality of packets includes a Frequency Hopping Sequence (FHS) packet, the receipt of the FHS packet triggering the determining of the reception time of each of the plurality of packets.

4. The method of claim 1, the method further comprising, for each of the received plurality of packets:
    identifying a packet type; and
    the determining of the reception times and the determining of the location of the wireless receiver being performed if the identified packet type is one of a first packet type and a second packet type.

5. The method of claim 4, the method further including:
    determining whether a predefined amount of time without receipt of a packet has passed.

6. The method of claim 5, the method further comprising:
    determining the corresponding time delay, td, for one of:
        each packet that is one of the first packet type and the second packet type based at least on the on the corresponding determined reception times; and
        each of the received plurality of packets based at least on the corresponding determined reception times; and
    wherein the determination of the time delay is performed immediately after one of:
        the determining of the reception time of each packet; and
        the predefined amount of time without receipt of a packet has passed.

7. The method of claim 5, wherein the identified packet type is an LMP_detach packet, the identification of the LMP_detach packet triggering the determining whether the predefined amount of time without receipt of a packet has passed.

8. The method of claim 6, wherein determining a target location of the second wireless transmitter/receiver is performed immediately after the determination of the time delay, td.

9. The method of claim 1, wherein determining a target location of the second wireless transmitter/receiver causes the first wireless transmitter/receiver to page the second wireless transmitter/receiver.

10. A wireless receiver, the wireless receiver configured to receive packets from a first wireless transmitter/receiver that pages a second wireless transmitter/receiver to establish a communication between the first wireless transmitter/receiver and receive packets from the second wireless transmitter/receiver, the wireless receiver and the first wireless transmitter/receiver being movable to a plurality of different locations, the wireless receiver comprising:
a receiver configured to:
receive a plurality of packets transmitted by the first wireless transmitter/receiver and transmitted by the second wireless transmitter/receiver at each of the plurality of different locations of the wireless receiver and for each establishment of a communication between the first wireless transmitter/receiver and the second wireless transmitter/receiver; and
a processing circuitry configured to:
at each of the plurality of different locations of the wireless receiver:
determine the location of the wireless receiver and the first wireless transmitter/receiver;
determine a reception time of each of the plurality of packets transmitted by the first wireless transmitter/receiver and the second wireless transmitter/receiver, the reception time of each of the plurality of packets having a corresponding time delay, td; and
determine a target location of the second wireless transmitter/receiver based on the time delays.

11. The wireless receiver of claim 10, wherein the establishment of a communication between the first wireless transmitter/receiver and the second wireless transmitter/receiver is initiated by a transmission of a Page message from the first wireless transmitter/receiver to the second wireless transmitter/receiver, and wherein the plurality of packets transmitted by the first wireless transmitter/receiver and transmitted by the second wireless transmitter/receiver is increased by a transmission of a Link Management Protocol (LMP) name request from the first wireless transmitter/receiver to the second wireless transmitter/receiver.

12. The wireless receiver of claim 10, wherein the received plurality of packets includes a Frequency Hopping Sequence (FHS) packet, the receipt of the FHS packet triggering the determining of the reception time of each of the plurality of packets.

13. The wireless receiver of claim 10, the processing circuitry being further configured to:
for each of the received plurality of packets, identify a packet type; and
perform the determining of the reception times and the determining of the location of the wireless receiver if the identified packet type is one of a first packet type and a second packet type.

14. The wireless receiver of claim 13, the processing circuitry being further configured to:
determine whether a predefined amount of time without receipt of a packet has passed.

15. The wireless receiver of claim 14, the processing circuitry being further configured to:
determine the corresponding time delay, td, for one of:
each packet that is one of the first packet type and the second packet type based at least on the on the corresponding determined reception times; and
each of the received plurality of packets based at least on the corresponding determined reception times; and
wherein the determination of the time delay, td, is performed immediately after one of:
the determining of the reception time of each packet; and
the predefined amount of time without receipt of a packet has passed.

16. The wireless receiver of claim 14, wherein the identified packet type is an LMP_detach packet, the identification of the LMP_detach packet triggering the determining whether the predefined amount of time without receipt of a packet has passed.

17. The wireless receiver of claim 15, wherein determining a target location of the second wireless transmitter/receiver is performed immediately after the determination of the time delay, td.

18. The wireless receiver of claim 10, wherein determining a target location of the second wireless transmitter/receiver causes the first wireless transmitter/receiver to page the second wireless transmitter/receiver.

19. A method for a wireless receiver, the wireless receiver being in communication with a first wireless transmitter/receiver that pages a second wireless transmitter/receiver to establish a communication between the first wireless transmitter/receiver and the second wireless transmitter/receiver, the wireless receiver and the first wireless transmitter/receiver being movable to a plurality of different locations, the method comprising:
at each of the plurality of different locations of the wireless receiver, and for each establishment of a communication between the first wireless transmitter/receiver and the second wireless transmitter/receiver:
determining the location of the wireless receiver and the first wireless transmitter/receiver;
receiving a plurality of packets transmitted by the first wireless transmitter/receiver and transmitted by the second wireless transmitter/receiver;
identifying a packet type for each of the plurality of packets;
determining a reception time of each of the plurality of packets transmitted by the first wireless transmitter/receiver and the second wireless transmitter/receiver, the reception time of each of the plurality of packets having a corresponding time delay, td;
determining the corresponding time delay, td, for one of:
each packet that is one of a first packet type and a second packet type based at least on the on the corresponding determined reception times; and
each of the received plurality of packets based at least on the on the corresponding determined reception times;
the determination of the time delay, td, being performed immediately after one of:
the determining of the reception time of each packet; and
a predefined amount of time without receipt of a packet has passed
determining a target location of the second wireless transmitter/receiver, td, based on the time delays.

20. The method of claim 19, wherein the time delay, td, is determined as:

$$td = (\text{Shift Time, MOD } (2 \times \text{slot time}) - \text{slot time})/2,$$

wherein Shift Time, MOD (2×slot time)>slot time; and where "Shift Time" is a determined reception time of a packet referenced to the determined reception time of a first received packet by the wireless receiver, and "slot time" is a time division multiplex (TDM) slot duration of a wireless system comprising the wireless receiver, the first wireless transmitter/receiver and the second wireless transmitter/receiver.

\* \* \* \* \*